Aug. 30, 1932.    C. S. GLENNY    1,874,498
STAND FOR KITCHEN UTENSILS
Filed Oct. 9, 1930    2 Sheets-Sheet 1
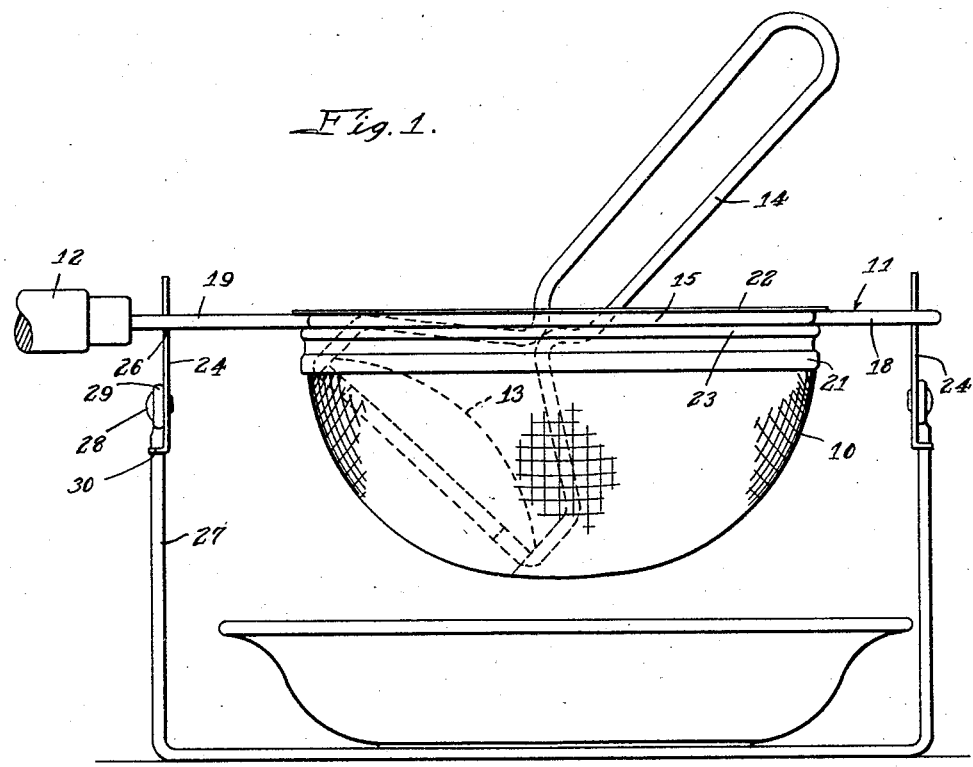
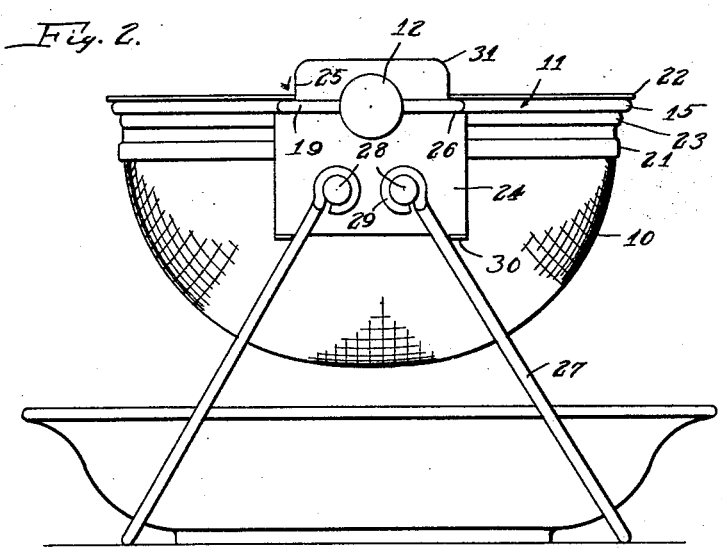
Inventor
By Clarence S. Glenny
Wilson, Dowell, McKenna & Rehm
Attys.

Aug. 30, 1932.  C. S. GLENNY  1,874,498
STAND FOR KITCHEN UTENSILS
Filed Oct. 9, 1930   2 Sheets-Sheet 2
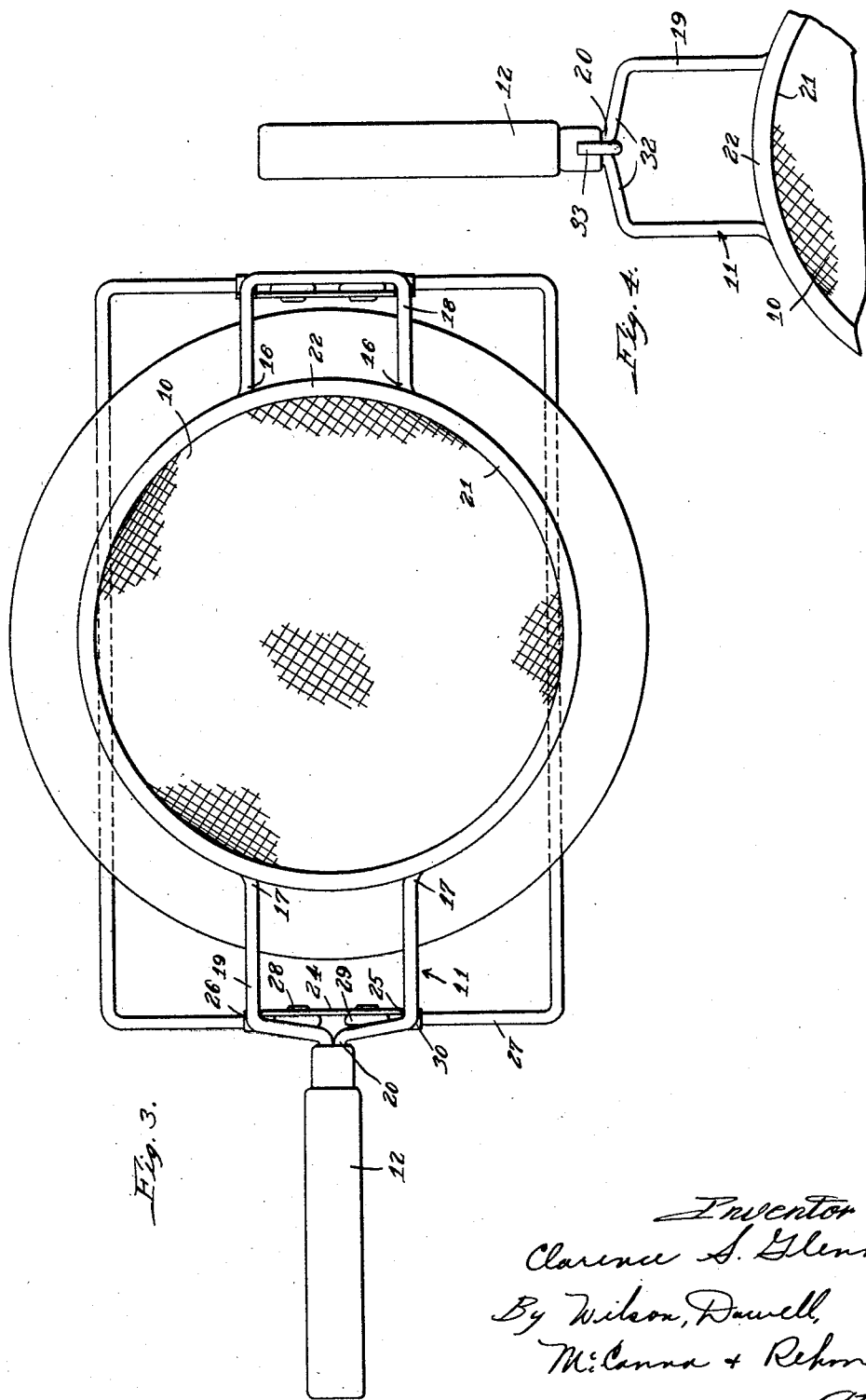

Patented Aug. 30, 1932

1,874,498

UNITED STATES PATENT OFFICE

CLARENCE S. GLENNY, OF ROCKFORD, ILLINOIS, ASSIGNOR TO THE WASHBURN COMPANY, OF WORCESTER, MASSACHUSETTS, A CORPORATION OF MASSACHUSETTS

STAND FOR KITCHEN UTENSILS

Application filed October 9, 1930. Serial No. 487,480.

This invention relates to kitchen utensils and more particularly a food press and stand therefor.

The principal object of my invention is to provide a stand designed to fold up to extremely compact form for easy storage in the kitchen cabinet, and which, when unfolded for use, affords a firm support for the food press and holds the press conveniently with reference to the dish into which the food is being pressed. It is a further object to so construct the frame of the press that it may be quickly and easily applied to or removed from the stand, and so that the press when removed can also be conveniently suspended on a hook in the kitchen cabinet.

In addition, it is the aim of this invention to provide a food press and stand therefor of simpler and more economical construction than has heretofore been available and one which is, furthermore, easier to take apart and put together and easier to clean.

The invention is illustrated in the accompanying drawings, in which—

Figs. 1 and 2 are, respectively, a front and side view of the food press and stand made in accordance with my invention, showing the way in which the same is used;

Fig. 3 is a plan view of Fig. 1; and

Fig. 4 is a fragmentary view showing how the press is arranged to be hung up.

The same reference numerals are applied to corresponding parts throughout the views.

The food press herein shown is similar to that illustrated in the copending application of Charles Andrews, Serial No. 474,231, filed August 9, 1930, and consists of a screen bowl or hopper 10 mounted in a frame 11 provided with a handle 12, and a roller 13 carried on a handle 14. The frame 11, as described in the other application, is made from a single piece of wire bent so as to form complemental arcuate portions 15 which together approximate a circle for reception of the bowl 10 but are bent outwardly at two laterally spaced points 16 at one side of the circle and at two other laterally spaced points 17 at the diametrically opposite side so as to form substantially U-shaped projecting toe and heel portions 18 and 19, respectively. The free ends of the wire project from the heel portion 19 into the handle 12, as indicated at 20. The toe and heel portions are adapted to support the utensil on the rim of a pan or other receptacle where the same is of suitable depth, as indicated in the other application. It is frequently desired, however, to press the food directly into a shallow dish in which the food is to be served at the table and it is for such a purpose that the stand hereinafter described is provided. In other words, if the housewife has a stand she is free to press foods into any form or depth of dish desired and it is obvious that the range of usefulness of the press is greatly increased.

In passing, it will be observed that the screen bowl 10 has the screen thereof held in a circular sheet metal frame 21 and that the upper edge of this frame is flanged outwardly to form a rim 22 slightly above an annular outwardly projecting bead 23 formed in the frame. The wire frame 11 is arranged to have the arcuate portions 15 thereof fit on the frame 21 between the rim 22 and bead 23. In order, however, that the frame 11 will hug the frame 21, the portions 15, which, of course, aggregate less than 360°, normally occupy a position within concentricity and, as the frame 11 is forced over the bead 23, which the resilience of the toe and heel portions 18 and 19 permits, the portions 15 are spread to a position beyond concentricity, with the result that after the portions 15 have passed over the bead 23, they contract and fit snugly between the rim 22 and bead 23 and keep the bowl from turning around or coming out. The bowl may, however, be removed quickly and easily when desired, either for the purpose of cleaning the utensil, or when a bowl having a different mesh screen is to be used.

The stand, with which the present invention is more particularly concerned, is made so as to cooperate with the frame 11 of the press to form a rigid support therefor and permit food to be pressed directly into any dish without special regard to the shape or depth thereof. The stand comprises a pair of sheet metal plates 24 notched out at their upper corners, as indicated at 25, to fit in the toe and heel portions 18 and 19 of the frame 11 and so as to provide shoulders 26 for the support of said toe and heel portions. The plates 24 are connected by a pair of U-shaped wire supporting legs 27, the elongated cross-portions of which are arranged to rest on the table top or work shelf and make for a good footing, and the upwardly projecting arms of which are pivotally connected to the outer side of the plates 24 by means of rivets 28 entered through the flattened looped ends 29 of said arms. The plates 24 have outwardly projecting lugs 30 on the lower corners thereof against which the legs 27 are arranged to be engaged, as shown in the drawings, when the stand is set up for support of the press. The legs are, in other words, spread apart for engagement with the lugs 30 and, as clearly appears in Fig. 2, this makes for good stability.

In operation, the frame 11 of the press is arranged to be pressed down at its toe and heel portions 18 and 19 over the upper ends of the plates 24. The corners on the plates are suitably rounded, as appears at 31, to facilitate application of the frame 11 thereon. By making the plates 24 wide enough between the cut-out portions 25 so that the toe and heel portions have to be spread slightly to slip them down over the plates, the frame is made quite rigid with the stand and there is no danger of the frame of the press working loose in the use of the roller 13. Furthermore, the supporting legs 27 can be made slightly longer than necessary to span the distance from the outer end of the toe portion 18 to the outer end of the heel portion 19, so that after the one plate 24 has been entered in the one portion of the frame 11 the legs 27 have to be sprung inwardly slightly to enter the other plate into the other portion of the frame 11, thus making the connection between the frame of the press and the stand very firm. The handle 12 will, of course, be held to keep the press and stand from sliding about during the operation of the roller. After the use of the press it can be removed from the holder quickly and easily as is thought to be self-evident. Then, the stand can be folded up by bringing the legs 27 together and it can be easily stored away in the kitchen cabinet in this compact form. The frame 11 of the press has the heel portion 19 preferably formed with the ends 32 making an obtuse angle with one another instead of being bent into alignment in order that the press can be hung up on a hook or nail in the kitchen cabinet, as indicated at 33 in Fig. 4. The handle 14 for the roller 13, it should also be clear, is formed so that it can also be hung up in the cabinet.

It is believed the foregoing description conveys a clear understanding of the various advantageous features of the utensil of my invention. The appended claims have been drawn with a view to covering all legitimate modifications and adaptations.

I claim:

1. A stand for supporting a utensil of the character described, comprising a pair of sheet metal plates having the upper ends thereof formed for demountably supporting the opposite ends of the utensil, a pair of substantially U-shaped wire supporting legs having the free ends of the upwardly projecting arms thereof pivotally secured to said plates, the pivots for the two legs being side by side on each plate and spaced upwardly from the lower ends of said plates, and a pair of outwardly projecting lugs provided at the lower corners of each of said plates arranged for engagement by the legs when the same are spread apart to supporting position, said legs being arranged to be folded toward each other when not in use.

2. The combination of a wire frame adapted to support a utensil, said frame having a central portion for the supporting of the utensil, and the frame being formed to provide, at diametrically opposite sides of said portion, radially projecting substantially U-shaped loop portions, and a stand comprising a pair of opposed supports formed for detachable snug reception between the sides of said loop portions, said loop portions affording not only broad supports for steady rest of the utensil on the stand but also affording the desired give in said frame for the purpose of permitting removal of the frame from the stand, the sides of said loop portions being resilient so that the frame, after spreading of the loop portions for entry of the supports, frictionally grips the latter.

3. The combination of a wire frame adapted to support a utensil, said frame having a central portion for supporting the utensil, and the frame being formed to provide, at diametrically opposite sides of said central portion, radially projecting open portions, said open portions affording broad supports for steady rest of the utensil on a stand, and a stand comprising a pair of opposed supports formed for detachably engaging in said open portions whereby to provide steady rest for the utensil.

4. A stand for supporting a utensil of the character described, comprising a pair of sheet metal plates having the upper ends thereof formed for demountably supporting the opposite ends of the utensil, a pair of substantially U-shaped wire supporting legs having the free ends of the upwardly projecting arms thereof pivotally secured to said plates, the pivots for the two legs being side by side on each plate and spaced upwardly from the lower ends of said plates, and means for limiting pivotal movement of said legs relative to said plates, whereby said legs are arranged to be folded toward each other when not in use and are arranged to be spread apart a predetermined distance to supporting position.

In witness of the foregoing I affix my signature.

CLARENCE S. GLENNY.